United States Patent Office 2,828,249
Patented Mar. 25, 1958

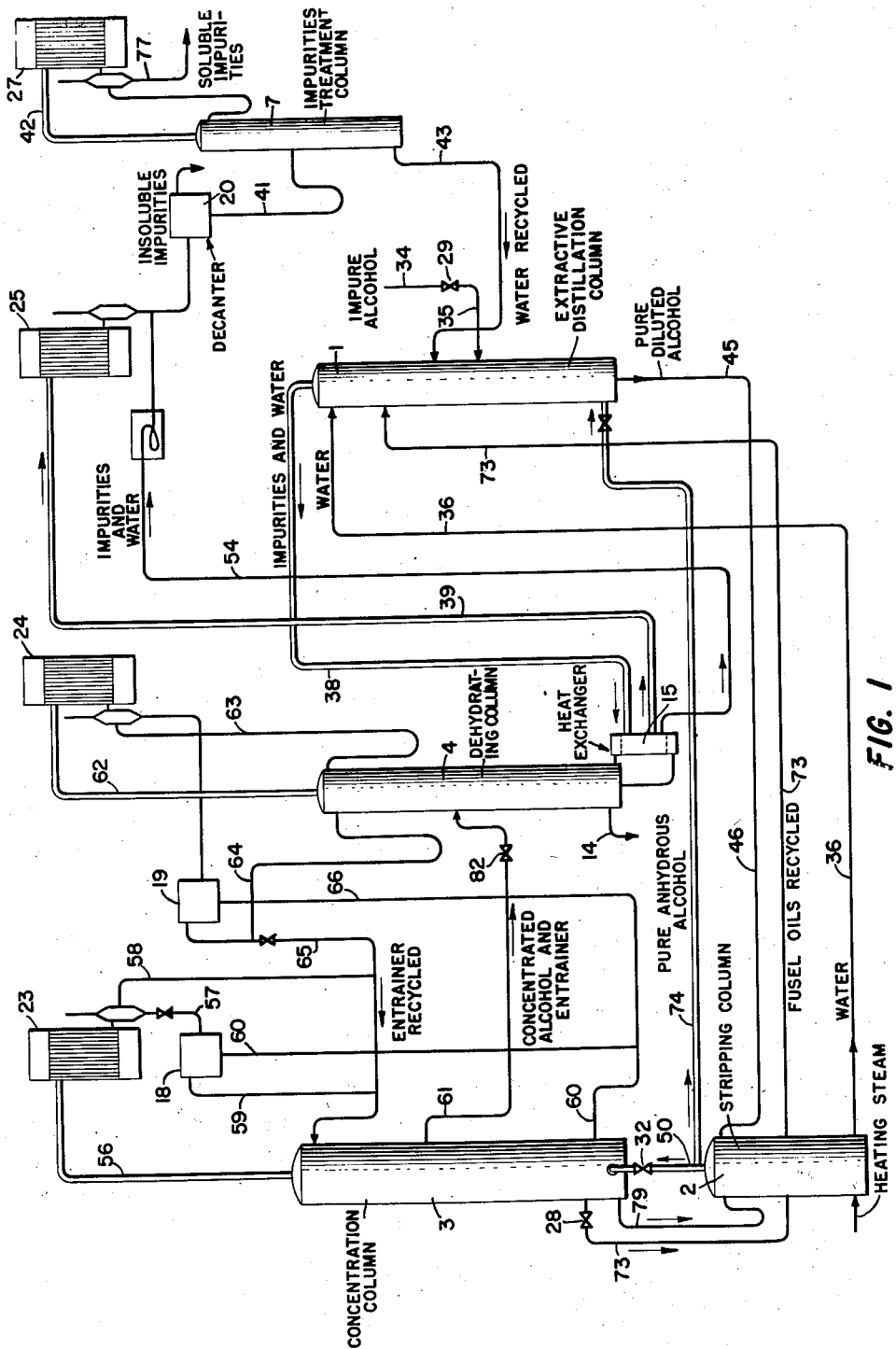

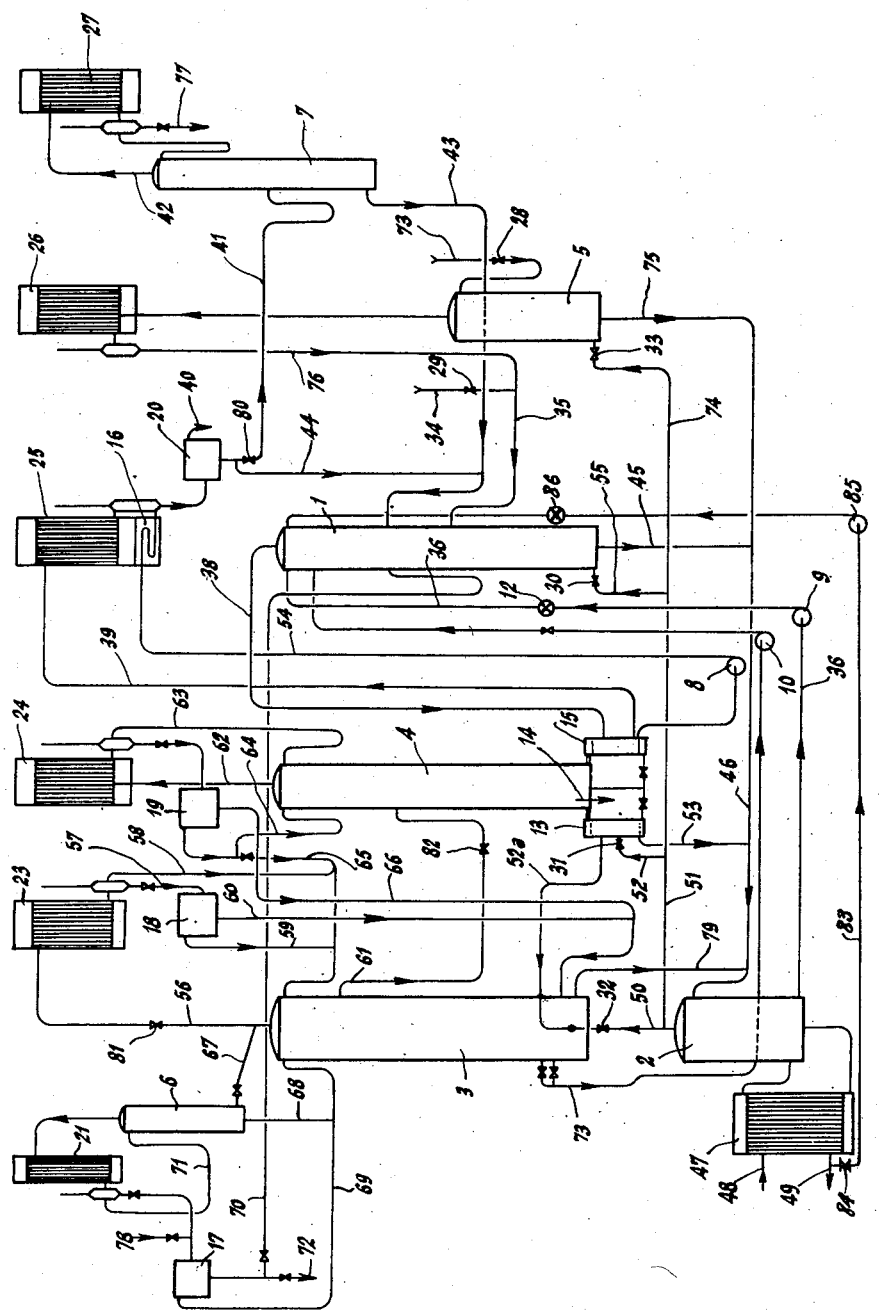

2,828,249

PROCESS AND APPARATUS FOR PURIFYING IMPURE ALCOHOLIC LIQUID

Alphonse Marie Emmanuel Jacques Maze-Sencier, deceased, late of Paris, France, by Henriette Marie Suzanne Maze-Sencier (born Pinot Perigord de Villiechenon), widow and heir and natural and legal guardian of three minor heirs, and Robert Marie Alfred Jacques Maze-Sencier, heir, Paris, France, and Ernest Charles, Clamecy, Nievre, and Lucien Louis Freisz, Maisons-Alfort, France, assignors to Dizem, Societe Anonyme, Geneva, Switzerland, a company of Switzerland Application October 28, 1954, Serial No. 465,358

Claims priority, application France October 30, 1953

6 Claims. (Cl. 202—39.5)

The problem of manufacture of anhydrous ethyl alcohol from impure ethyl alcohol has been solved by employing a number of methods, including the so-called azeotropic methods. By means of azeotropic methods, it is possible to obtain a high proportion of anhydrous alcohol as compared with the amount of starting, impure alcohol. When azeotropic methods are employed for the treatment of impure alcohols such as the so-called "bad taste" alcohols, whatever the origin of the same may be, it is not possible to obtain a practically pure anhydrous alcohol, i. e., an alcohol containing but a few grams of impurities per hundred litres thereof. Where it is desired to obtain an anhydrous alcohol of a high purity from impure alcohols it is practically necessary to subject the impure alcohols to a previous rectification. Successive rectification and dehydration steps involve a very large consumption of heat and detract from the desirability of the process; furthermore the proportion of pure alcohol obtained with respect to the starting impure alcohol is substantially reduced. In addition, the "bad taste" alcohols as obtained in the rectification step have a lower commercial value. Finally so far as a common rectification or a hydroselection followed with a rectification is carried out, it is not possible economically to separate methanol present as an impurity according to conventional techniques.

It is a main object of our invention to provide an improved process for treating ethanolic liquids having a high content of impurities to obtain substantially pure alcohol therefrom, particularly anhydrous alcohol, with a practically quantitative yield and a very low consumption of heat.

Our invention broadly comprises the combined steps of subjecting impure alcoholic liquid to a hydroselection treatment, then concentrating the dilute alcoholic liquid which has been substantially purified by hydroselection, and dehydrating the concentrated product thus obtained, the last two steps being carried out in the presence of an azeotropic water entrainer. In effecting the combined treatment, any impurities that were not removed from the liquid as it passed through the hydroselection column are withdrawn from suitable parts of the concentrating plant and recycled to a suitable point in the hydroselection column and are eventually discarded free from ethanol.

Because of heat recovery, it is then possible to purify in a very economical manner in such combined treatments, phlegms (impure alcohols obtained through distillation from fermented musts), other impure alcohols and musts which otherwise would have to be rectified before being dehydrated according to azeotropic methods. In that connection an essential object of our invention is to recover heat available in the vapours from the purifying column for partly heating the final dehydrating column; such a possibility of recovery arises from the valuable fact that the vapours referred to are at a temperature of approximately 100° C. A further advantage is that the supply of heat which is required for producing anhydrous rectified alcohol is less than the amount required for producing high grade rectified alcohol (96–96.5 parts by volume of ethanol).

Furthermore, the process according to our invention makes possible the easy removal of any methanol contained in the starting impure alcohol.

According to the preferred procedure for carrying our invention into effect, a known technique is applied with a characteristic feature to be pointed out below. According to that known technique, preheated impure alcohol, is fed to the middle section of an extraction distillation zone or purifying column. Into the top portion of the zone or column, hot water or a hot, mainly aqueous liquid is supplied, said zone or column being heated at the foot, in order that the vapours withdrawn from the top be practically free from ethanol but laden with the major part of impurities which are present in the starting impure alcohol, while a partly purified alcoholic dilution is withdrawn from the bottom. The alcoholic dilution is subjected to exhaustion stripping in a second zone or column, from the bottom of which hot wash is withdrawn which may be employed as a source of hot water for delivery into the top of the purifying zone or column.

For dehydrating the alcoholic dilution recovered in vapour phase from said second column, the known principle of two-step azeotropic distillation is resorted to. For that purpose, a substance capable of entraining water azeotropically is maintained in the upper section of a concentrating zone or column, and from the lower portion of the zone in said column where the entrainer operates, there is withdrawn a liquid having a high alcohol content and a low water content which is forwarded to the middle section of a dehydrating zone or column, in order that the whole water content is withdrawn in vapour phase from the top of the dehydrating zone or column as a ternary azeotrope, while pure, anhydrous alcohol is withdrawn from the bottom of the same.

A characteristic feature of our invention is that from the top of the exhausting (stripping) or second column, vapours are withdrawn and employed as heating medium for the purifying column. The remainder of vapours from the exhausting or second column, or a portion thereof, are passed through a heater at the foot of the final dehydrating column and any uncondensed vapours are fed to the base of the concentrating column.

With the improved process according to this invention, we may treat either liquids having a relatively high alcohol content such as phlegms, or liquids having a relatively poor alcohol content such as musts directly available from an alcoholic fermentation.

In the latter case it is only necessary to subject such musts to a substantially quantitative exhaustion of impurities in an auxiliary column, for obtaining through condensation of overhead vapours, an impure liquid which will be treated like a phlegm; desirably the auxiliary column will also be heated with vapours from the exhausting or second column.

The supply of heat to the purifying column and the supply of hot, mainly aqueous liquid to the top of said column are so controlled that the overhead vapours are substantially free from ethanol while a dilute phlegm having an alcohol content of about 5 to about 15 percent by volume is withdrawn from the foot of said column. The amount of heat to be supplied to the base of the purifying column will be of from about 20 to about 50 calories per kilogram of said dilute phlegm withdrawn from the foot.

As the overhead vapours from the purifying column are at a high temperature of the order of 98 to 100° C., they are used as an indirect heating medium at the base of the dehydrating column. The condensation product from said vapours is caused to settle into a layer containing water-insoluble impurities and an aqueous liquid laden with water-soluble impurities; the aqueous liquid is then distilled to remove impurities as heads and is returned to the purifying column.

The overhead vapours from the purifying column supply to the dehydrating column a major part of the heat required for operating the same; a supplemental, controllable heat supply is procured by vapours from the exhausting column.

By means of the heat supplied to the base of the exhausting column, it is possible to heat the concentrating column and to avail of enough heat excess for heating the purifying column, supplying suplemental heat to the base of the dehydrating column and finally heating any must pre-purifying column where one is employed. About 20 to about 50 calories per kilogram of liquid withdrawn from the base of the exhausting column and about 20 to about 50 calories per kilogram of wash from the base of the must pre-purifying column are required for a satisfactory operation of said columns.

According to a practice which is known per se, phlegm wash from the foot of the purifying column may be employed as hot aqueous liquid to be fed to the top portion of the purifying column. The operating conditions for the purifying column, particularly the supply of heat to the base thereof and the volume of hot aqueous liquid will be so controlled that the concentration of total alcohols on the lower plates ranges from about 5 percent or better 7 percent to about 15 percent, a concentration of the order of 10 percent being preferred.

The following description with reference to the herewith drawing given by way of non-limiting example will show how our invention may be carried into effect.

Figures 1 and 2 are respectively a simplified flow diagram and a diagram for treating phlegms or musts according to our invention.

The apparatus comprises four main columns, viz. a purifying or first column 1, an exhausting (stripping) or second column 2, a concentrating or third column 3 and a dehydrating or fourth column 4, columns 2 and 3 being connected together according to a conventional practice by a vapour rise pipe 50 and a liquid downflow pipe 79.

The treatment of impure phlegm will firstly be referred to.

The starting phlegm, preferably preheated, is fed through a pipe 34 having a control valve 29, then a pipe 35 into the middle section of purifying column 1. Through a pipe 36 with a pump 9 and a flow measuring device e. g. a rotameter 12 therein, the purifying column 1 receives so much boiling wash from the foot of exhausting (stripping) column 2 that there remains practically no ethyl alcohol present at the top of column 1 and the alcohol content in the liquid withdrawn from the foot of column 1 through pipe 45 ranges between 5 and 15 percent by volume.

Overhead vapours withdrawn from the top of purifying column 1 through a pipe 38 are delivered to an auxiliary heater 15 at the base of dehydrating column 4 where they are partly condensed; the remainder of said vapours is forwarded to a condenser 25 through a pipe 39. The condensed liquid is added in a cooler 16 to the cooled liquid obtained from the condensation of vapours in heater 15 and sent to said cooler 16 by means of a pump 8 through a pipe 54; the liquid mixture from cooler 16 is discharged into a decanter 20 where it settles into two layers; the oily upper layer, mainly containing water-insoluble impurities such as iso-amyl alcohol, butyl alcohol, ethyl acetate, diethyl acetal and the like is discarded through a pipe 40 while the aqueous lower layer is wholly or in some cases in part forwarded through a pipe 41 having a control valve 80, to the middle section of a small column 7 heated in its base. The overhead vapours from column 7 are delivered through a pipe 42 to a condenser 27, and the heads thus condensed (containing acetaldehyde, a little methanol, isopropyl alcohol, esters and the like) are partly refluxed to the top of column 7, partly withdrawn through pipe 77.

The aqueous liquid from the bottom of column 7 is forwarded through a pipe 43 to a suitable plate in column 1 above the feed ingress point; a portion of the aqueous layer from decanter 20 may be fed to pipe 43 through a pipe 44. It should be remarked that no condensed liquid is refluxed on to the topmost plates of purifying column 1.

From the base of purifying column 1 purified phlegm is withdrawn through a pipe 45 and sent to the top of stripping column 2 through a pipe 46. The exhausting column 2 receives in its base an amount of heat controlled to secure a normal stripping of wash; the heating may be effected indirectly by means of a heater 47 receiving heating steam through a pipe 48 and from which condensed water from said steam may be discarded through a pipe 49.

A portion of the vapours from the top of exhausting column 2 is derived through pipes 51, 52 and/or 55, the last two pipes having control valves 30, 31 respectively, and is employed for heating the base of columns 1 and 4. The remainder of vapours from the top of column 2 is delivered to the base of column 3 by a pipe 50 provided with a control valve 32. As far as column 4 is concerned, the vapours fed thereto through pipe 52 provided with control valve 31 and branching off from pipe 51, are delivered to a heater 13, the liquid condensed therein being returned through a pipe 53 to the feed pipe 46 for exhausting column 2. Uncondensed vapour from heater 13 is returned to the base of column 3 through a pipe 52a. As to column 1, the vapours taken from pipe 51 through pipe 55 having a controlled valve 30 are employed for direct heating of said column. Valves 30, 31 and 32 enable of controlling the heating of columns 1, 4 and 3.

Column 3 is charged in the upper section thereof, with a conventional water entrainer, preferably benzene or a gasoline fraction having a boiling range of 80–110° or better a narrower boiling range, preferably 90–100°. Through pipe 56, the major part of vapours from the top of column 3, are directed to a condenser 23, the vapour flow being controlled by means of a valve 81. A ternary liquid is condensed in condenser 23 and the major part of which is fed to a decanter 18 through a pipe 57 while the remainder is refluxed through a pipe 58 to the top of column 3. Through a pipe 59, there is refluxed to the same point the upper entrainer layer built up in decanter 18, and through a pipe 60 the lower layer is returned to the bottom portion of column 3.

From a plate in column 3 on which the liquid has a high alcohol and entrainer content but a low water content, that is to say at about the foot portion of the upper third of column 3, a liquid draw-off pipe 61 provided with a control valve 82 extends to the dehydrating column 4. From the foot of column 4, pure anhydrous alcohol is withdrawn through a pipe 14. From the top of column 4, vapours of a ternary mixture containing the whole amount of water are withdrawn through a pipe 62 and delivered to a condenser 24; a portion of the condensed liquid is refluxed to the top of column 4 through a pipe 63 and the remainder of said liquid is returned to a decanter 19; the upper layer built up in decanter 19 and having a high entrainer content is partly refluxed to column 4 through pipe 64 and partly sent through pipe 65 into pipe 59 running to column 3. The lower layer from decanter 19 is returned to the foot of column 3 through a pipe 66 and pipe 60.

A controlled portion of the vapours from the top of column 3 is delivered through a pipe 67 to the base of a column 6 provided for the purpose of removing any head impurities which were not removed in purifying column 1. The vapours from column 6 are condensed in a condenser 21; a portion of the condensate thus formed is refluxed to the top of column 6 through a pipe 71, and the remainder is sent to decanter 17 together with an amount of diluting water supplied through a pipe 78. The upper layer from decanter 17 is returned to the top of column 3 through a pipe 69. The lower layer containing head impurities is returned to the upper part of column 1 to be freed from ethanol therein. Where the impure starting alcohol contains methanol, the methanol will be found in the lower layer in decanter 17. In that case, the lower layer instead of being forwarded to column 1 through pipe 70, is withdrawn through a pipe 72 to be continuously treated in a column for concentrating methanol (not shown).

High boiling impurities which have not been removed in purifying column 1 are withdrawn through a pipe 73 from the plate or plates in column 3 where they concentrate, to be forwarded through a pump 10 to the suitable plate in column 1.

With a view to being capable of treating fermented musts as starting materials the apparatus so far described may be altered or supplemented as will presently set forth. The musts will be previously be heated in a must-heater or through indirect heat exchange with distillation wash or preferably by both means successively; the heating devices referred to are common in distillation practice and have not been shown. The hot musts are fed to the upper part of a column 5 through a pipe 73 having a control valve 28. Column 5 is heated by a means of vapours from column 2, led from pipe 51 through a pipe 74 having a control valve 33; in column 5, the musts are largely freed from impurities and the purified liquid is conveyed from the bottom of column 5 to the top of column 2 through a pipe 75 and pipe 46; the overhead vapours from column 5 are condensed in a condenser 26 and the impure condensed liquid is supplied to column 1 through a pipe 76 and pipe 35.

The remainder of the apparatus operates as in the case of treatment of phlegms. However the liquid withdrawn from the base of column 2 is a slop containing impurities from the fermented material instead of being phlegm wash, and consequently is not desirable for effecting hydroselection in purifying column 1. It is then necessary to shut valve 12 and to feed boiling water from another source to the upper part of purifying column 1; such hot water may conveniently be condensation water taken off at 49 from heater 47 for column 2, said water being led from pipe 49 through a pipe 83 having a cut-off valve 84 to the top portion of column 1, by means of a pump 85 inserted in pipe 83 in which a rotameter 86 is also inserted.

The following example which is not limiting will illustrate our invention.

*Example*

100 litres of impure ethyl alcohol having a strength of 90 percent by volume were fed to purifying column 1 through pipe 34, the supply being controlled by valve 29. Said 100 litres of alcohol contained 0.2 kg. of aldehydes reckoned as acetaldehyde, 0.5 kg. of esters reckoned as ethyl acetate and 1 kg. of higher alcohols reckoned as isobutyl alcohol .

Purifying column 1 was supplied at the top with 1,300 kgs. of boiling wash from the bottom of exhausting column 2, and, at the base thereof, with 50,000 calories provided by the heating vapours from the top of column 2.

The liquid withdrawn from the base of purifying column 1 was forwarded to column 2 where it was exhaustively deprived of alcohol. Alcohol was concentrated in column 3 charged with a mixture by equal part of benzene and gasoline (boiling range 90–100° C.). A mixture of alcohol, benzene and gasoline containing but a small amount of water (about 3 percent) was withdrawn from column 3 at a rate controlled by valve 82, and finally dehydrated in column 4. The charge of entrainer in column 3 was adjusted by controlling the return of upper layer from decanter 19 to said column.

The vapours evolving from the top of purifying column 1 were at a temperature of 99°; they were partly condensed in heater 15 for column 4, the remainder being condensed in condenser 25. The condensed liquid from condenser 25 was cooled in cooler 16 and passed to decanter 20. The upper layer, about 1 kg., contained higher alcohols with esters and acetaldehyde dissolved therein. The lower layer (about 80 litres) was forwarded to column 7 where head impurities were concentrated.

Any higher alcohols which might have escaped the purifying action in purifying column 1 were concentrated as in usual rectification, on particular plates of concentration column 3; 18 to 20 litres of alcohol laden with said higher alcohols were withdrawn from the plates referred to through pipe 73 and returned to purifying column via pump 10.

The heat flow of about 120,000 calories which passed through exhausting column 2 was divided into two portions, one portion (about 50,000 calories) was employed to heat purifying column 1, while the other portion (about 70,000 calories) was employed to heat columns 4 and 3.

Column 4 was heated gratuitously by the heat flow passed through purifying column 1 plus a portion of vapours from column 2.

The amounts indicated in the foregoing example are amounts per hour, the process being carried out continuously.

What we claim is:

1. In the production of ethanol from an impure hydroethanolic liquid, the combined steps of introducing said impure liquid in preheated condition into an intermediate point of an extractive distillation zone; feeding hot aqueous liquid to the top of said extractive distillation zone to maintain an internal liquid reflux having a high water content in said extractive distillation zone, and to drive ethanol from said impure ethanolic liquid down to the base of said extractive distillation zone, thereby providing purified hydroalcoholic bottoms in said base; introducing the bottoms from said extractive distillation zone into the upper part of a stripping zone having a bottom heating section; supplying heat to said bottom heating section; introducing a portion of the overhead vapours from said stripping zone into the lower part of said extractive distillation zone, and another portion into the lower part of an alcohol concentrating, distillation zone containing a water entrainer, to produce at an intermediate point in the last-named zone, a ternary mixture of ethanol, water entrainer and water, substantially free from impurities and having a low water content; drawing off said ternary mixture as a side-stream from said alcohol concentrating, distillation zone and feeding the same into an intermediate point of a dehydrating distillation zone, to obtain substantially pure, anhydrous ethanol as bottoms in the last-named zone; refluxing liquid from the bottom of said alcohol concentrating, distillation zone into the top of said stripping zone; withdrawing hot aqueous liquid from said bottom heating section of said stripping zone for employing the same as said feed to the top of said extractive distillation zone; passing the whole overhead vapour effluent from said extractive distillation zone in indirect heat exchange relationship with the liquid in the bottom of said dehydrating distillation zone; and controlling the introduction of overhead vapours from said stripping zone into said lower part of said extractive distillation zone, and the feed of hot aqueous liquid from said bottom heating section of said stripping zone to said extractive distillation zone, so that the alcohol content in the bottoms from said extractive distillation zone ranges between 5 and 15 percent by volume and said overhead vapour effluent from said extractive distillation zone is substantially free from ethanol and is at a temperature in the neighborhood of 100° C.

2. The process of claim 1, which comprises the additional step of passing a portion of the overhead vapours from said stripping zone in heat exchange relationship with the bottoms in said dehydrating distillation zone, for heating purposes.

3. The process of claim 2, which comprises the additional step of condensing said overhead vapour effluent from said extractive distillation zone after said passage thereof in indirect heat exchange relationship with the bottoms from said dehydrating distillation zone, to obtain a condensate, causing said condensate to settle into an oily layer and an aqueous layer, distilling a portion of said aqueous layer to remove impurities thereof as heads, and a mainly aqueous residual liquid as bottoms, and returning said residual liquid to said extractive distillation zone between said intermediate point thereof and the top of the same.

4. The process of claim 1, said impure hydroethanolic liquid having a low alcohol content, which process comprises the initial, additional step of feeding said liquid in preheated condition to the top section of a must distilling zone, said must distilling zone being heated at its base; condensing the overhead vapours from said must distilling zone to obtain a condensate; feeding said condensate into said intermediate point of said extractive distillation zone; and introducing the bottoms from said must distillation zone into the upper part of said stripping zone.

5. The process of claim 4, which further comprises introducing a portion of the overhead vapors from said stripping zone into the bottom of said must distillation zone for heating the same.

6. The process of claim 4, which further comprises passing steam in indirect heat exchange relationship with the liquid in said bottom heating section of said stripping zone to effect said heat supply thereto and simultaneously to provide, in the form of hot condensate from said steam, said hot aqueous liquid to be introduced into the top of said extractive distillation zone.

References Cited in the file of this patent

UNITED STATES PATENTS

| | | |
|---|---|---|
| 887,793 | Guillaume | May 19, 1908 |
| 996,328 | Guillaume | June 27, 1911 |
| 2,107,265 | Archibald | Feb. 8, 1938 |
| 2,148,846 | Von Retze et al. | Feb. 28, 1939 |
| 2,290,442 | Metzl | July 21, 1942 |
| 2,382,044 | Fisher | Aug. 14, 1945 |
| 2,591,672 | Catterall | Apr. 8, 1952 |
| 2,620,294 | Carlson | Dec. 2, 1952 |
| 2,635,992 | Carlson et al. | Apr. 21, 1953 |
| 2,647,078 | Chambers | July 28, 1953 |
| 2,707,164 | Muller et al. | Apr. 26, 1955 |
| 2,702,783 | Harrison et al. | Feb. 22, 1955 |

FOREIGN PATENTS

| | | |
|---|---|---|
| 298,136 | Switzerland | July 1, 1954 |